United States Patent [19]
Koechlin

[11] 3,745,395
[45] July 10, 1973

[54] SPACER FOR THE WINDINGS OF AN ELECTRICAL MACHINE

[75] Inventor: Paul Koechlin, 90-Belfort, France

[73] Assignee: UNELEC, Paris, France

[22] Filed: Oct. 13, 1971

[21] Appl. No.: 188,873

[30] Foreign Application Priority Data
Oct. 13, 1970 France .................. 7037000

[52] U.S. Cl. ................... 310/260, 310/270
[51] Int. Cl. .......................... H02k 3/46
[58] Field of Search.............. 310/260, 270, 64, 310/65, 180

[56] References Cited
UNITED STATES PATENTS

| | | |
|---|---|---|
| 3,014,146 | 12/1961 | Andres................ 310/270 |
| 630,930 | 8/1899 | Reist.................. 310/270 |
| 3,123,729 | 3/1964 | Fagel................. 310/260 X |
| 2,848,634 | 8/1958 | Decaudaveine........ 310/260 |
| 1,122,187 | 12/1914 | Behrend.............. 310/260 |

Primary Examiner—D. F. Duggan
Attorney—Craig, Antonelli & Hill

[57] ABSTRACT

A spacer for the windings projecting from the magnetic core of a motor or generator in the form of an arcuate support for attachment to the core and defining axially extending guides on which are mounted a set of circumferentially spaced and radially extending blades for separating the windings.

13 Claims, 8 Drawing Figures

INVENTOR
PAUL KOECHLIN
BY Craig, Antonelli & Hill
ATTORNEYS

SPACER FOR THE WINDINGS OF AN ELECTRICAL MACHINE

The present invention relates to a spacer for the windings of an electrical machine.

It is usually necessary to provide, in an electric generator or large electric motor, a spacer placed outside the magnetic core to separate the windings and hold them in position.

It has been proposed to place a spacer at the point where the windings project from the magnetic core, which spacer was in the form of combs and the windings of the electrical machine were passed between the teeth of the combs. The combs were intended to limit the degree of movement of the windings where they project from the magnetic core. Any movement at this point may lead to the partial removal of the insulating sheath of the windings. As these combs were usually fixably attached to the magnetic core by screws, they also prevented the windings from undergoing a rotation due to electromagnetic forces on the ends of the windings.

The combs however have several disadvantages. They are expensive to produce because of the materials and accurate machining which are required. Furthermore as the combs cannot usually be fixed directly against the end of the magnetic core, it is necessary to project the windings still further from the core and thus increase the size of the machine.

According to the present invention, there is provided a spacer for the windings of an electrical machine where these project from the magnetic core thereof, comprising an arcuate support for attachment to the core and defining axially extending guides on which are mounted a set of circumferentially spaced and radially extending individual blades for separating the windings.

The present invention will be further described in more detail, by way of examples only, with reference to the accompanying drawings, in which.

Figure 3:
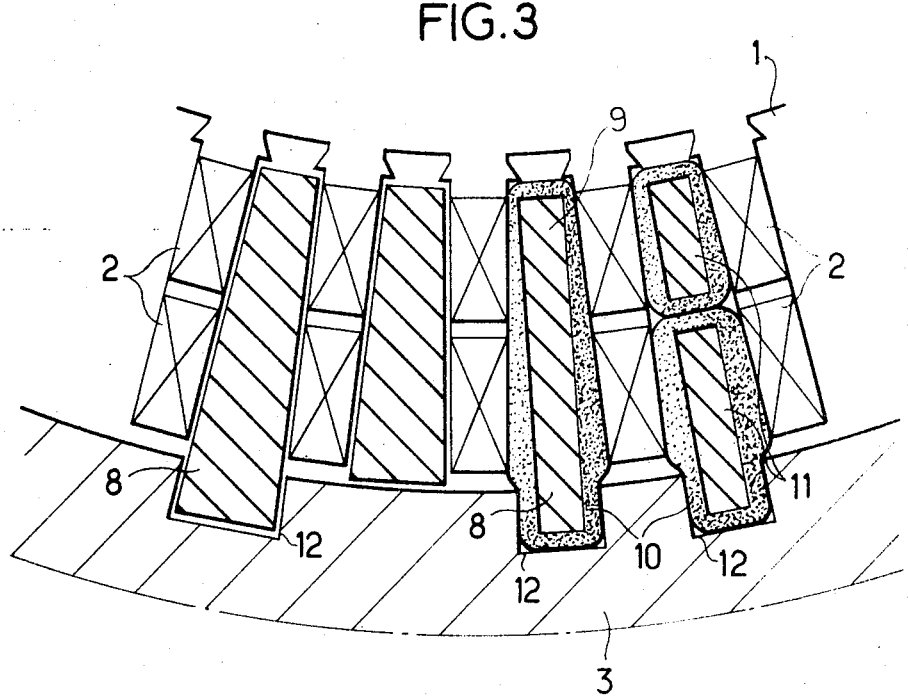
Figure 4:
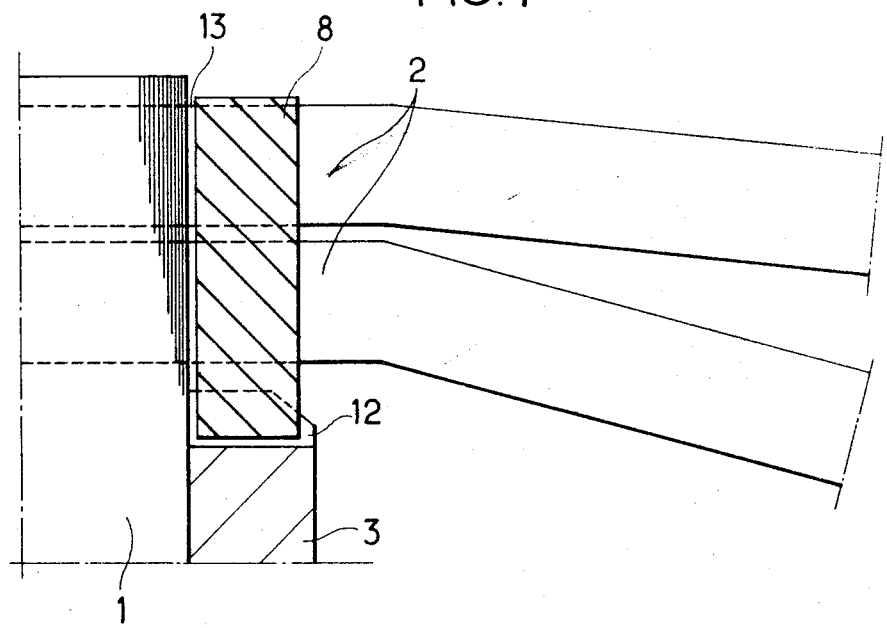
Figure 5:
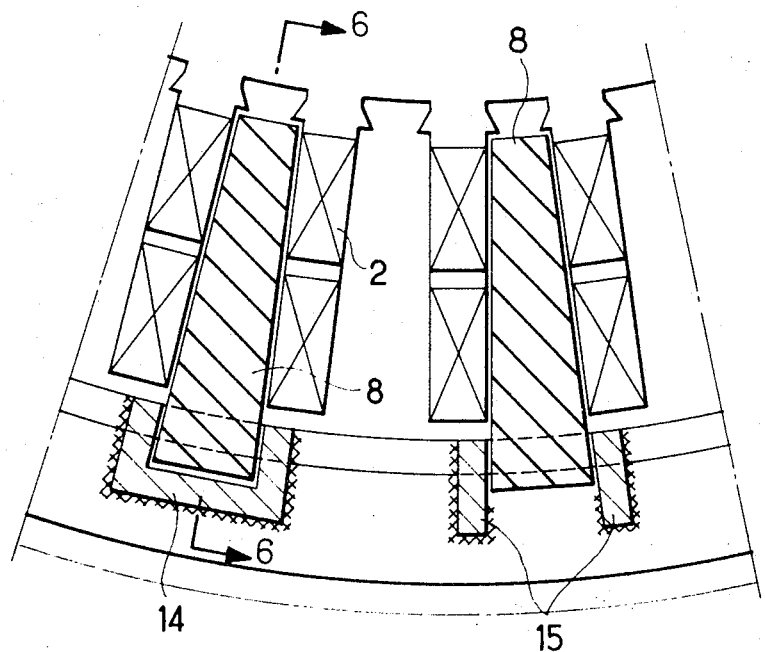
Figure 6:
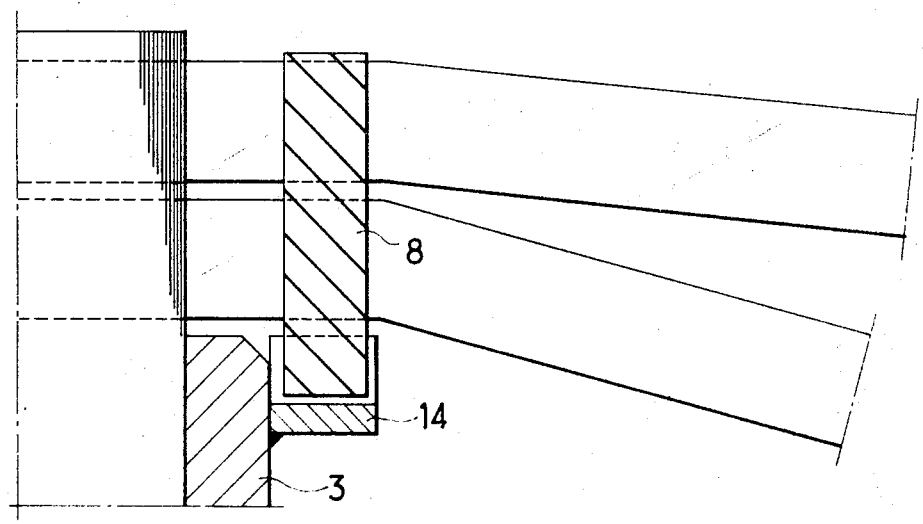
Figure 7:
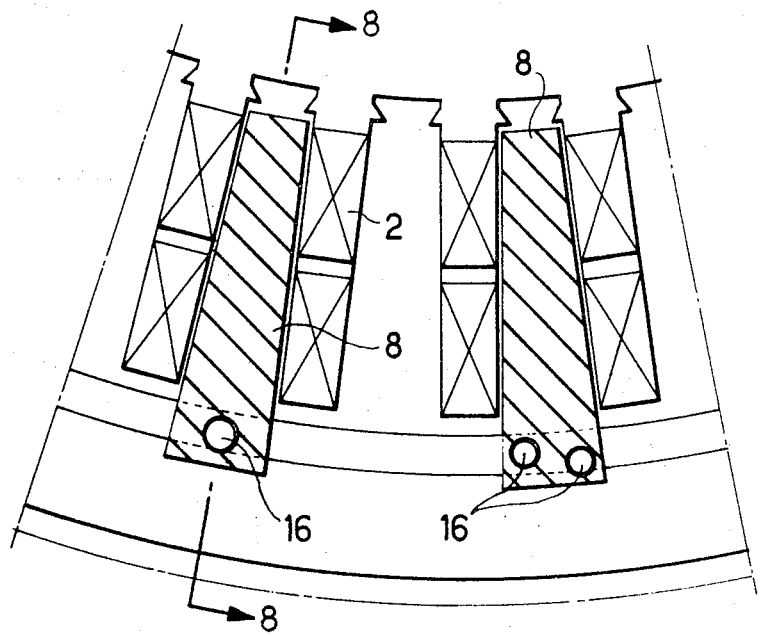
Figure 8:
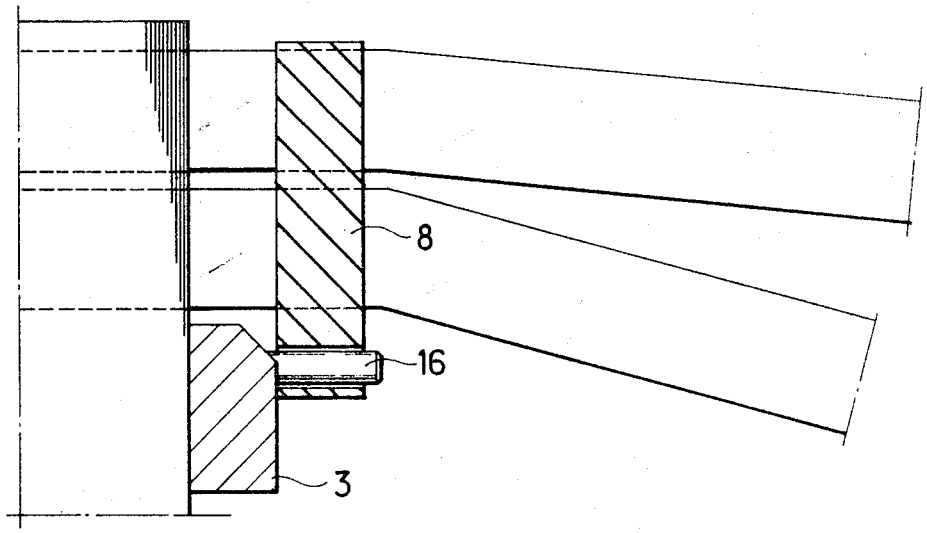

FIGS. 3, 5 and 7 respectively are a partial end view of the stator of an electrical machine fitted with three new types of spacer;

FIGS. 4, 6 and 8 are partial axial sections of the stators as shown in FIGS. 3, 5 and 7 respectively.

In the drawings, reference numerals common to more than one figure designate the same parts.

Figure 1:
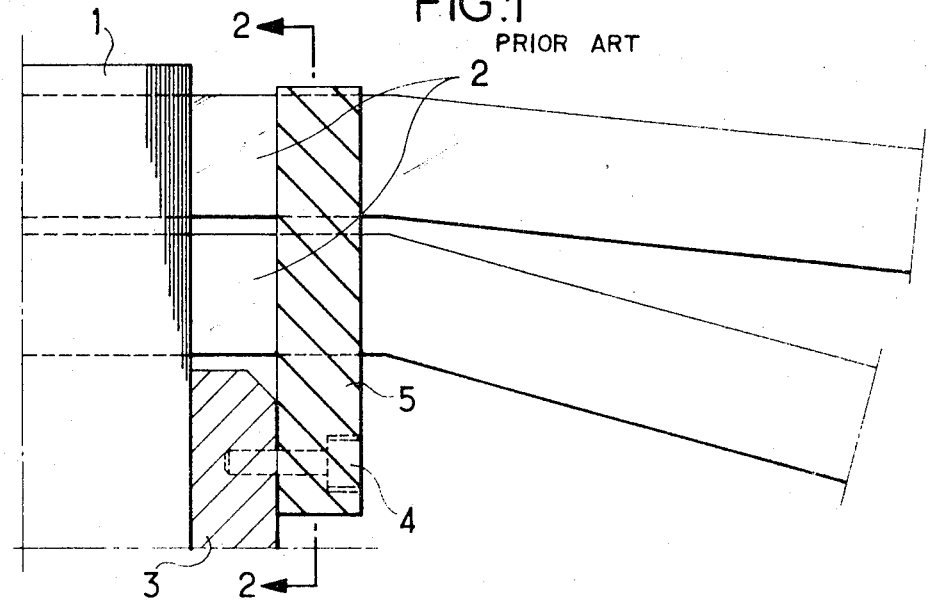
FIG. 1 shows a partial cross-section of the stator of an electrical machine having a known spacer.
Figure 2:
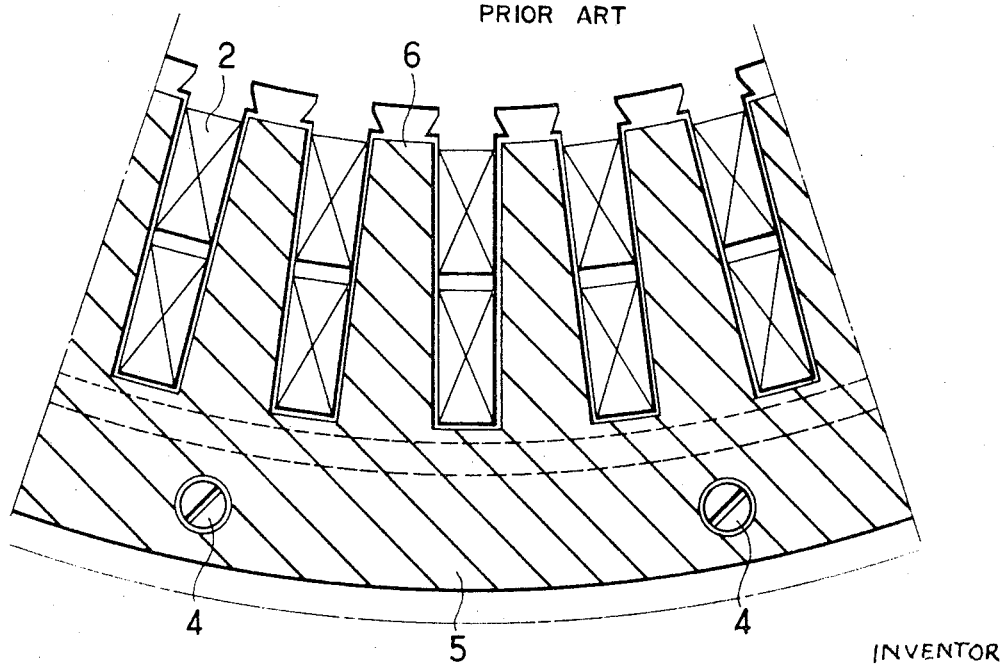
FIG. 2 is a section along the line II—II of FIG. 1.

Referring to FIGS. 1 and 2, the stator has a laminated magnetic core 1 from which project straight portions 2 of the windings. The magnetic core 1 is bound by a binding plate 3 which may be in the form of a ring. A comb 5 is screwed to the binding plate 3 by screws 4. The comb 5 which is of electrically insulating material has teeth 6 between which are inserted the straight portions of the winding. The comb 5 is displaced from the core 1 by a distance equal to the thickness of the binding plate 3. The comb 5 must be accurately machined as must the laminations of the magnetic core.

Referring to FIG. 3 a set of electrically insulating blades 8 are placed between the straight portions 2 of the windings where they project from the magnetic core 1, and are embedded in the binding plate 3. In the figure the blades are placed immediately adjacent the magnetic core 1 but they may be displaced from it by a certain distance, for example 10 millimeters, in order to allow for ventilation. It can be seen that in this way it is possible to place the blades at the best distance from the magnetic core and it is no longer necessary to take into account the thickness of the binding ring 3.

The blades may be wedge shaped so as to fit between successive straight portions of the windings.

The blades may be of a layered material for example a material with a base of paper, wood or fiber glass and held together by a natural or synthetic resin, for example phenolic, cresolic, melamine, polyester, epoxy or silicone resin capable of withstanding the operating temperature.

The dimensions of the blades are a function of the dimensions of the windings and of the position of the binding plates 3. However, it is desirable that their width, in the axial direction of the machine, is equal to at least two thirds of the radial width of the straight portions of the windings.

The blades are preferably mounted with an adhesive, in liquid or paste form, so as to hold them firmly in position. The blades may also be mounted having previously surrounded them with a layer of compressible material which may be preimpregnated with a resin or thermo-hardening adhesive. This layer can be of a fabric, a felt or synthetic or glass fibers.

The advantage of the layer is that it allows insulating blades, for example which are layered, to be used which are not accurately machined for the purpose. For example standard blades may be brought and covered with the compressible layer without necessitating accurate machining.

Each blade can be a single piece or, as is shown in FIG. 3, formed of two smaller pieces 11. The blades 8 which may be single blades, combinations of a web 9 surrounded by the layer 10 or the two smaller pieces 11 also surrounded by the layer 10 are embedded in grooves 12 placed in the binding plate 3.

The advantage of having two separate pieces forming a blade is that it facilitates the mounting of the blade when the windings are wound. In fact, for these types of windings, the upper straight portion is generally mounted first and followed by the lower straight portion.

If the winding does not undergo an impregnation treatment but only, for example, undergoes a polymerization treatment, it is advantageous to use a preimpregnated layer which will polymerize at a temperature equal to or greater than that of the surroundings. For example, a polyester resin or epoxy adhesive may be used. If the winding undergoes an impregnation treatment, it is more uneconomical to use a non-impregnated layer since the impregnation resin itself is sufficient.

It can be seen that the spacer is as firm as a comb of insulating material.

The number of grooves 12, their length and depth are chosen so that the blades are held sufficiently firmly, taking into account their sharing resistance. However, generally at least six to 12 grooves are used which are symmetrically distributed around the binding plate.

The grooves 12 are placed along the axes of the teeth of the magnetic core 1. For this reason, the blade 8 shown on the left of FIG. 3 is longer than the blade shown immediately to its right in this figure. These two blades are wedge shaped to take into account the tapering of the gaps between the windings. It can be seen how when the layer 10 is used, as with the two blades at the right of the figure, it is no longer necessary to machine the blades to fit in the gaps between the windings.

FIG. 4 shows the blade 8 mounted without an insulating layer in the groove 12 in the binding plate 3. It can be seen how the distance 13 between the blade 8 and the magnetic core 1 can be freely chosen. After mounting the winding and all the blades, the windings are held as firmly to the magnetic circuit as is the case with an insulating comb.

Referring to FIG. 5, metallic U-shaped parts 14 are welded or screwed to the binding plate. On the right of the figure two metallic blocks are screwed or welded to the binding plate their separation distance being equal to the thickness of a blade at its base. The blades can then be slotted into these guides as shown.

FIG. 6 shows a section along the line VI–VI of FIG. 5 and it can be seen how the blades are then spaced from the magnetic core 1. Referring to FIG. 7 and FIG. 8 which is a section along the line VIII—VIII of FIG. 7, an insulating blade 8, on the left of the FIG. 7, is threaded on a pin 16. On the right of FIG. 7, an insulating blade 8 is threaded on two pins 16. This is an alternative method of fastening the blades to a support which may be the binding plate.

The ends of the straight portions of the windings must be able to expand relative to the magnetic core as their expansion coefficient is greater than that of the magnetic core. The straight portions adjacent the fastened blades can expand freely.

If the windings are to undergo an impregnation treatment after mounting, it is sufficient to provide around the grooves or pin holes, anti-adhesive means such as a layer of anti-adherent. A thin film of an anti-adherent, for example cellulose triacetate, polyvinyl fluoride, tetrafluoroethylene or an analogous chemical compound may be used. This allows the axial sliding of blades relative to the magnetic core. These anti-adhesive means do not hinder the properties of the blades as regards spacing and holding in position the straight portions of the windings relative to the magnetic core.

The spacer may be used, for example, for the stators, rotor or induction windings of electric motors or electric generators.

A spacer, as described, is less expensive than the proposed combs. Also it does not require complicated and precide manufacturing.

What I claim is:

1. A spacer for the windings of an electrical machine, which windings project from the magnetic core thereof, comprising an arcuate support attached to the core and defining axially extending guides and a set of circumferentially spaced and radially extending separate blade elements individually mounted in said axially extending guides for separating the windings.

2. A spacer as defined in claim 1, wherein the blade elements are mounted in said guides in the plane of said arcuate support.

3. A spacer as claimed in claim 1, wherein additional blade elements are placed between the individual blades.

4. A spacer as claimed in claim 3, wherein a binding plate for the laminations of the magnetic core forms the arcuate support.

5. A spacer as claimed in claim 4, wherein the guides are grooves in the binding plate.

6. A spacer as claimed in claim 4, wherein the grooves are defined by projection members fastened to the binding plate.

7. A spacer as claimed in claim 6, wherein the projection members are metal U-shaped parts.

8. A spacer as claimed in claim 3, wherein the guides are pins fixed to the magnetic core.

9. A spacer as claimed in claim 3, wherein the guides are pins fixed to the binding plate.

10. A spacer as claimed in claim 1, wherein each blade element is formed of two separate halves.

11. A spacer as claimed in claim 1, wherein the blade element are covered with a layer of anti-adhesive material at the end thereof which contacts the guides.

12. A spacer as claimed in claim 1, wherein the blade element are surrounded by a compressible layer.

13. A spacer as claimed in claim 12, wherein the compressible layer is pre-impregnated.

* * * * *